United States Patent
Bloms et al.

(10) Patent No.: US 7,100,552 B2
(45) Date of Patent: Sep. 5, 2006

(54) CONTROL SYSTEM AND METHOD FOR VARIABLE VALVE ACTUATION SYSTEM

(75) Inventors: Jason Kenneth Bloms, Peoria, IL (US); James J. Faletti, Spring Valley, IL (US); Scott Alan Leman, Eureka, IL (US); David Andrew Pierpont, Peoria, IL (US); James Richard Weber, Lacon, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/144,131

(22) Filed: May 14, 2002

(65) Prior Publication Data

US 2003/0213450 A1 Nov. 20, 2003

(51) Int. Cl.
*F01L 1/34* (2006.01)

(52) U.S. Cl. .................. 123/90.16; 123/90.15; 123/320

(58) Field of Classification Search ... 123/90.15–90.17, 123/320–322, 90.16
See application file for complete search history.

(56) References Cited

U.S. PATENT DOCUMENTS

| | | |
|---|---|---|
| 3,250,068 A | 5/1966 | Vulliamy |
| 4,084,557 A | 4/1978 | Luria |
| 4,138,973 A | 2/1979 | Luria |
| 4,174,683 A | 11/1979 | Vivian |
| 4,424,790 A | 1/1984 | Curtil |
| 4,426,985 A | 1/1984 | Kanesaka |
| 4,561,253 A | 12/1985 | Curtil |
| 4,794,892 A | 1/1989 | Konno |
| 4,815,423 A | 3/1989 | Holmer |
| 4,869,222 A | 9/1989 | Klassen |
| 4,960,095 A * | 10/1990 | Koike et al. ............ 123/425 |
| 5,003,939 A * | 4/1991 | King ...................... 123/90.16 |
| 5,220,899 A * | 6/1993 | Ikebe et al. .............. 123/531 |
| 5,233,948 A | 8/1993 | Boggs et al. |

(Continued)

FOREIGN PATENT DOCUMENTS

| | | |
|---|---|---|
| GB | 2018352 A | 10/1979 |
| JP | 61106918 | 5/1986 |
| JP | 05106415 A2 | 4/1993 |
| JP | 08158901 | 6/1996 |
| JP | 2000120457 A | 4/2000 |
| JP | 2000145484 A | 5/2000 |
| WO | WO 95/24549 | 9/1995 |
| WO | WO 98/02653 | 1/1998 |

OTHER PUBLICATIONS

Edwards et al., "The Potential of a Combined Miller Cycle and Internal EGR Engine for Future Heavy Duty Truck Applications," The Engineering Society for Advancing Mobility Land Sea Air and Space International, International Congress and Exposition, Feb. 23–26, 1998, pp. 1–19.

(Continued)

*Primary Examiner*—Thomas Denion
*Assistant Examiner*—Jaime Corrigan
(74) *Attorney, Agent, or Firm*—Finnegan, Henderson, Farabow, Garrett & Dunner, LLP

(57) ABSTRACT

A method of controlling a variable valve actuation system is provided. A cam assembly is operated to move an intake valve between a first position where the intake valve blocks a flow of fluid and a second position where the intake valve allows a flow of fluid. At least one operating parameter of the engine is sensed. A valve actuation period is determined based on the at least one operating parameter. A valve actuator is engaged with the intake valve to prevent the intake valve from returning to the first position in response to operation of the cam assembly. The valve actuator is released to allow the intake valve to return to the first position at the end of the determined valve actuation period.

36 Claims, 6 Drawing Sheets

U.S. PATENT DOCUMENTS

| | | | |
|---|---|---|---|
| 5,255,637 A | | 10/1993 | Schechter |
| 5,408,979 A | | 4/1995 | Backlund et al. |
| 5,427,078 A | * | 6/1995 | Hitomi et al. ............ 123/559.1 |
| 5,445,128 A | | 8/1995 | Letang et al. |
| 5,469,818 A | * | 11/1995 | Yoshioka et al. ........ 123/90.15 |
| 5,553,573 A | | 9/1996 | Hara et al. |
| 5,576,963 A | | 11/1996 | Ribbens et al. |
| 5,590,626 A | * | 1/1997 | Hitomi et al. ............ 123/90.15 |
| 5,622,144 A | | 4/1997 | Nakamura et al. |
| 5,682,854 A | | 11/1997 | Ozawa |
| 5,775,283 A | | 7/1998 | Sawai et al. |
| 5,857,437 A | * | 1/1999 | Yoshioka ................. 123/90.15 |
| 5,927,075 A | | 7/1999 | Khair |
| 5,992,361 A | * | 11/1999 | Murata et al. ............ 123/90.17 |
| 6,006,706 A | * | 12/1999 | Kanzaki ................... 123/90.15 |
| 6,021,758 A | | 2/2000 | Carey et al. |
| 6,026,786 A | | 2/2000 | Groff et al. |
| 6,082,328 A | | 7/2000 | Meistrick et al. |
| 6,170,441 B1 | | 1/2001 | Haldeman et al. |
| 6,209,516 B1 | | 4/2001 | Yamashita |
| 6,237,551 B1 | | 5/2001 | Macor et al. |
| 6,267,107 B1 | | 7/2001 | Ward |
| 6,273,076 B1 | | 8/2001 | Beck et al. |
| 6,279,550 B1 | | 8/2001 | Bryant |
| 6,301,887 B1 | | 10/2001 | Gorel et al. |
| 6,301,889 B1 | | 10/2001 | Gladden et al. |
| 6,302,076 B1 | | 10/2001 | Bredy |
| 6,467,452 B1 | | 10/2002 | Duffy et al. |
| 6,571,765 B1 | | 6/2003 | Kuboshima et al. |
| 6,651,618 B1 | | 11/2003 | Coleman et al. |
| 6,688,280 B1 | | 2/2004 | Weber et al. |
| 2002/0013653 A1 | | 1/2002 | Ohyama et al. |
| 2002/0026913 A1 | | 3/2002 | Ariga |
| 2002/0046741 A1 | * | 4/2002 | Kakuho et al. ........ 123/568.14 |
| 2002/0177938 A1 | * | 11/2002 | Sellnau et al. .............. 701/110 |
| 2003/0164163 A1 | | 9/2003 | Lei et al. |
| 2003/0183185 A1 | | 10/2003 | Sun et al. |

OTHER PUBLICATIONS

Obert, "Internal Combustion Engines and Air Pollution," Based on Internal Combustion Engines, Third Edition, 1973, pp. 612–614.

Challen et al., "Diesel Engine Reference Book, Section Edition," SAE International, 1999, pp. 75, 81, 84, 146, and 263–305.

Yorihiro Fukuzawa et al., "Development of High Efficiency Miller Cycle Gas Engine", Mitsubishi Heavy Industries, Ltd., Technical Review, vol. 38, No. 3, Oct. 2001, pp. 146–150.

Request for Inter Parles Reexamination Transmittal Form for U.S. Patent No. 6,88,280, and Attachment to Request for Inter Parties Reexamination Transmittal Form, Sept. 17, 2004.

Request for Inter Partes Reexamination Transmittal Form for U.S. Patent No. 6,651,618, and Attachment to Request for Inter Parties Reexamination Transmittal Form, Aug. 27, 2004.

http://www.mazda.com.au/corpora/209.html, Oct. 16, 2001, p. 1–6.

U.S. Appl. No. 10/144,145, filed May 14, 2002, pp. 1–27.
U.S. Appl. No. 10/144,145, filed May 30, 2003.
U.S. Appl. No. 10/144,145, filed Dec. 12, 2003.
U.S. Appl. No. 10/144,145, filed Mar. 10, 2004.
U.S. Appl. No. 10/144,145, filed Jun. 18, 2004.

* cited by examiner

CONTROL SYSTEM AND METHOD FOR VARIABLE VALVE ACTUATION SYSTEM

TECHNICAL FIELD

The present invention is directed to a system and method for controlling a variable valve actuation system. More particularly, the present invention is directed to a system and method for controlling a variable valve actuation system in an internal combustion engine.

BACKGROUND

Fuel efficiency and emission reductions are a concern in the design and operation of an internal combustion engine, such as, for example, a diesel, gasoline, or natural gas engine. Accordingly, a significant amount of research and development work is being directed towards reducing the emissions while maintaining or improving the fuel efficiency of these types of engines. Any increase in fuel efficiency will directly translate to a reduction in the fuel costs associated with operating the engine along with the production of carbon dioxide.

Oxides of nitrogen ("NOx") are another constituent of engine emissions that researchers are trying to reduce. NOx production is generally proportional to temperatures of combustion and volume of excess air. Unfortunately, fuel efficiency also is generally proportional to these same factors. Conventional NOx reduction techniques include increasing the mass of inert matter, such as water or recirculated exhaust gas, in a combustion chamber prior to combusting a fuel air mixture. These measures may reduce the temperature of combustion and may also reduce the fuel efficiency.

One possible approach to improving fuel efficiency involves improving control over the flow of gases into and out of the engine. This may be accomplished by modifying the typical engine valve actuation system to provide flexibility in the actuation timing of the intake and exhaust valves. This may allow the flow of gases to and from the engine to be tailored to meet the particular operating conditions of the engine.

The engine valves in an internal combustion engine are typically driven by a cam arrangement that is operatively connected to the crankshaft of the engine. The rotation of the crankshaft results in a corresponding rotation of a cam that drives one or more cam followers. The movement of the cam followers results in the actuation of the engine valves. The shape of the cam governs the timing and duration of the valve actuation.

An engine may, however, include a variable valve actuation system, such as described in U.S. Pat. No. 6,237,551 to Macor et al., issued on May 29, 2001. In this type of system, the cam arrangement is configured to hold the engine valves open for a certain period of time and an auxiliary valve is included to selectively disengage the cam assembly. This allows the engine valves to be closed earlier than provided by the timing of the cam assembly and improves the control over valve actuation timing.

The improved control provided by a variable valve actuation system may allow for gains in fuel efficiency. The variable valve actuation system may be operated to selectively implement a variation on the typical diesel or Otto cycle during the operation of the engine. For example, the intake valves may be controlled to implement a "late intake" type Miller cycle. In a late intake Miller cycle, the intake valves are opened for the intake stroke and held open for a portion of the compression stroke of the piston.

The implementation of such an actuation timing variation may, however, have a detrimental effect on the performance of the engine under certain operating conditions. For example, the implementation of a late intake Miller cycle may reduce the compression ratio within the combustion chambers and reduce the amount of air flow through the engine. The reduced compression ratio and air flow may negatively impact the performance of the engine when the engine is subject to a load increase, such as, for example, an acceleration.

The system and method of the present invention solves one or more of the problems set forth above.

SUMMARY OF THE INVENTION

In one aspect, the present invention is directed to a method of controlling a variable valve actuation system. A cam assembly is operated to move an intake valve between a first position where the intake valve blocks a flow of fluid and a second position where the intake valve allows a flow of fluid. At least one operating parameter of the engine is sensed. A valve actuation period is determined based on the at least one operating parameter. A valve actuator is engaged with the intake valve to prevent the intake valve from returning to the first position in response to operation of the cam assembly. The valve actuator is released to allow the intake valve to return to the first position at the end of the determined valve actuation period.

In another aspect, the present invention is directed to an intake valve actuation system for an engine. An intake valve is moveable between a first position where the intake valve prevents a flow of fluid and a second position where the intake valve allows a flow of fluid. A cam assembly is connected to the intake valve to move the intake valve between the first position and the second position. A valve actuator is selectively operable to engage the intake valve and prevent the intake valve from returning to the first position. A sensor is operable to sense an operating parameter of the engine. A controller is operable to determine a valve actuation period based on the sensed parameter of the engine.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
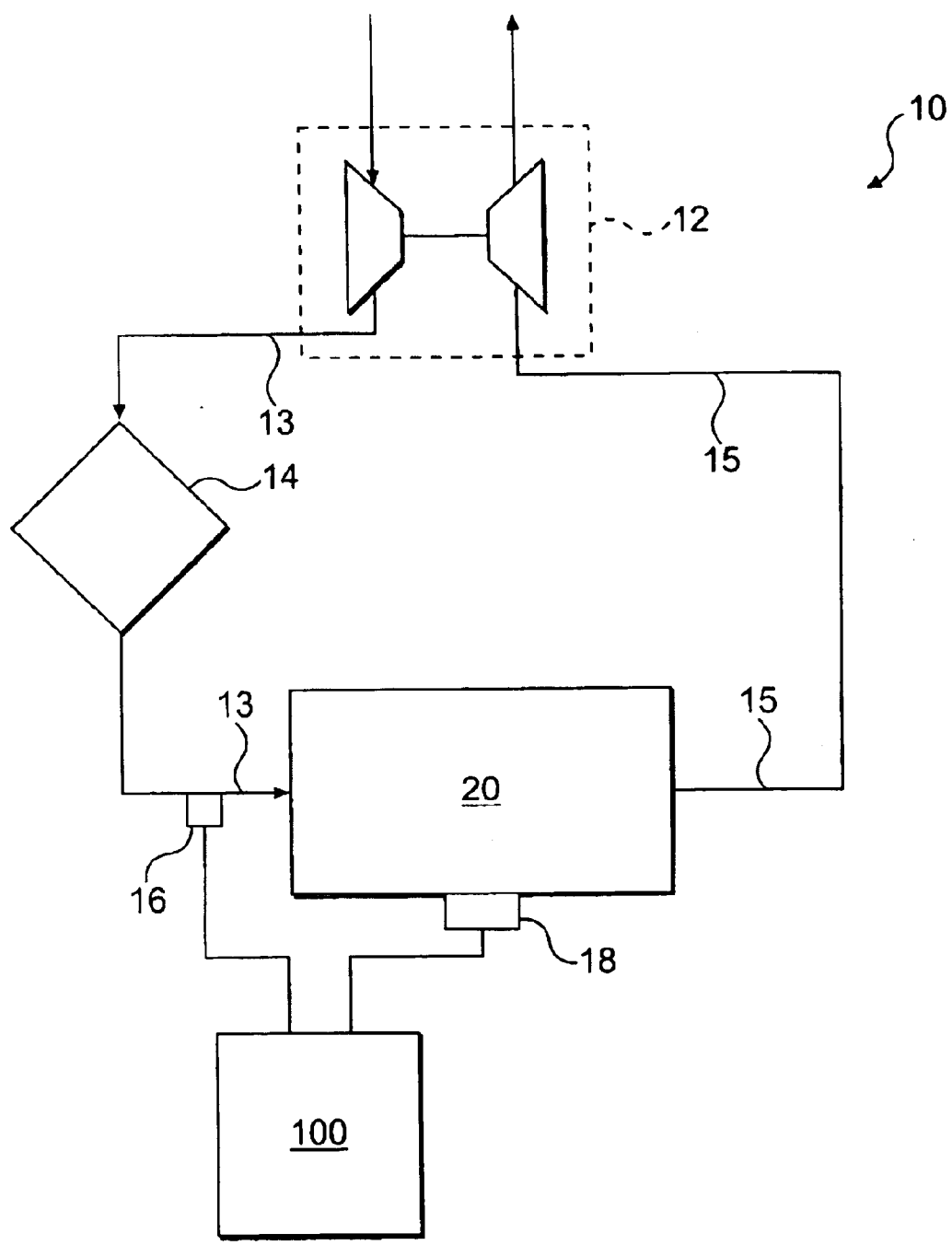
FIG. 1 is a diagrammatic and schematic representation of an engine system in accordance with an exemplary embodiment of the present invention.

An exemplary embodiment of an engine system 10 is illustrated in FIG. 1. Engine system 10 includes an intake air passageway 13 that leads to an engine 20. One skilled in the art will recognize that engine system 10 may include various components, such as, for example, a turbocharger 12 and an aftercooler 14. An exhaust air passageway 15 may lead from engine 20 to turbocharger 12.

Figure 2:
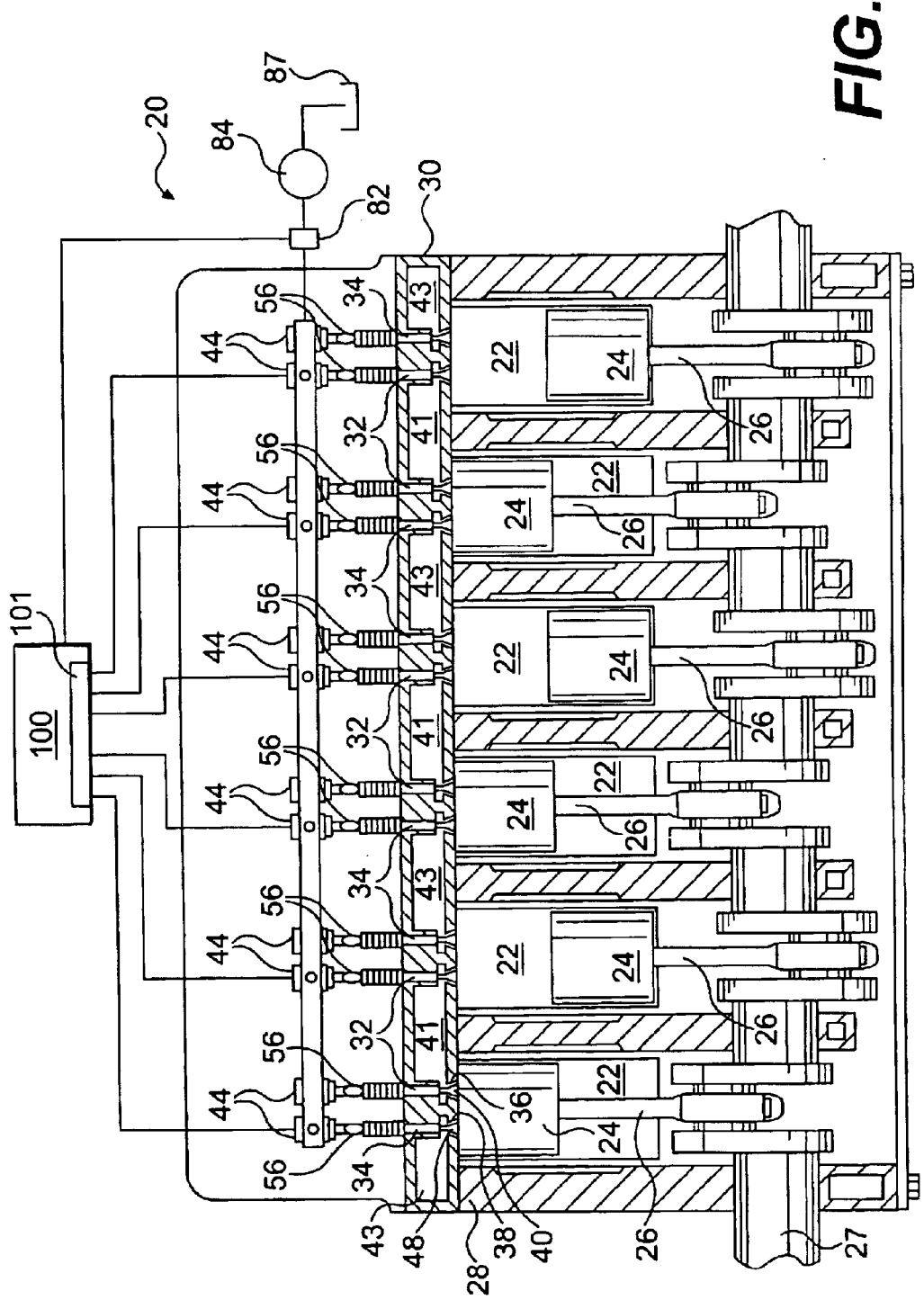
FIG. 2 is a diagrammatic cross-sectional view of an internal combustion engine in accordance with an exemplary embodiment of the present invention.

Engine 20 may be an internal combustion engine as illustrated in FIG. 2. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

As illustrated in FIG. 2, engine 20 includes an engine block 28 that defines a plurality of cylinders 22. A piston 24 is disposed for sliding movement between a top dead center position and a bottom dead center position within each cylinder 22. In the illustrated embodiment, engine 20 includes six cylinders 22 and six associated pistons 24. One skilled in the art will recognize that engine 20 may include a greater or lesser number of pistons 24 and that pistons 24 may be disposed in an "in-line" configuration, a "V" configuration, or any other conventional configuration.

As also shown in FIG. 2, engine 20 includes a crankshaft 27 that is rotatably disposed within engine block 28. A connecting rod 26 connects each piston 24 to crankshaft 27. Each piston 24 is coupled to crankshaft 27 so that a sliding motion of piston 24 within the respective cylinder 22 results in a rotation of crankshaft 27. Similarly, a rotation of crankshaft 27 will result in a sliding motion of piston 24.

Engine 20 also includes a cylinder head 30. Cylinder head 30 defines an intake passageway 41 that leads to at least one intake port 36 for each cylinder 22. Cylinder head 30 may further define two or more intake ports 36 for each cylinder 22.

An intake valve 32 is disposed within each intake port 36. Intake valve 32 includes a valve element 40 that is configured to selectively block intake port 36. As described in greater detail below, each intake valve 32 may be actuated to lift valve element 40 to thereby open the respective intake port 36. The intake valves 32 for each cylinder 22 may be actuated in unison or independently.

Cylinder head 30 also defines at least one exhaust port 38 for each cylinder 22. Each exhaust port 38 leads from the respective cylinder 22 to an exhaust passageway 43. Cylinder head 30 may further define two or more exhaust ports 38 for each cylinder 22.

An exhaust valve 34 is disposed within each exhaust port 38. Exhaust valve 34 includes a valve element 48 that is configured to selectively block exhaust port 38. As described in greater detail below, each exhaust valve 34 may be actuated to lift valve element 48 to thereby open the respective exhaust port 38. The exhaust valves 34 for each cylinder 22 may be actuated in unison or independently.

Figure 3:
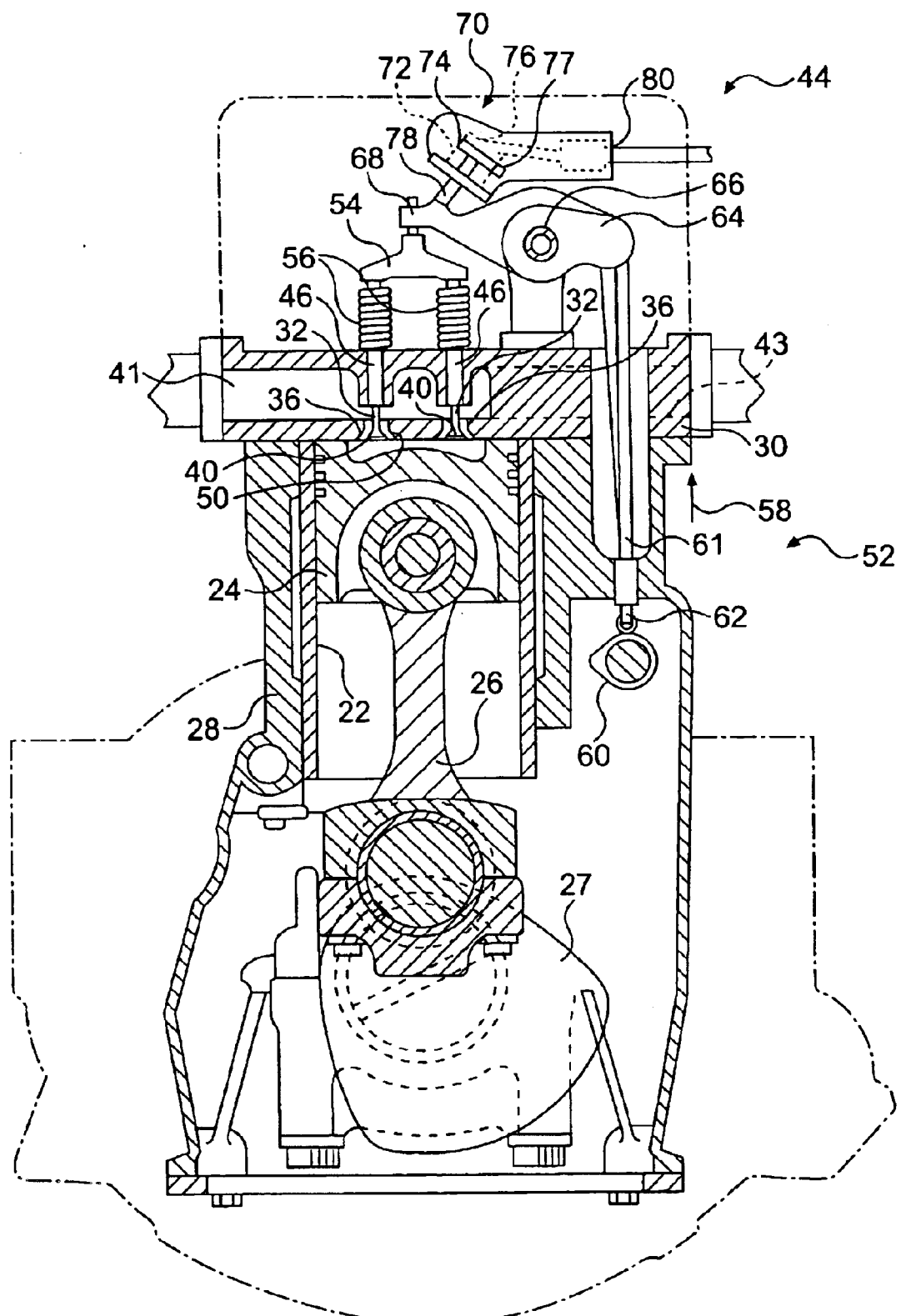
FIG. 3 is a diagrammatic cross-sectional view of a cylinder and valve actuation assembly in accordance with an exemplary embodiment of the present invention.

FIG. 3 illustrates an exemplary embodiment of one cylinder 22 of engine 20. As shown, cylinder head 30 defines a pair of intake ports 36 connecting intake passageway 41 to cylinder 22. Each intake port 36 includes a valve seat 50. One intake valve 32 is disposed within each intake port 36. Valve element 40 of intake valve 32 is configured to engage valve seat 50. When intake valve 32 is in a closed position, valve element 40 engages valve seat 50 to close intake port 36 and blocks fluid flow relative to cylinder 22. When intake valve 32 is lifted from the closed position, intake valve 32 allows a flow of fluid relative to cylinder 22.

Similarly, cylinder head 30 may define two or more exhaust ports 38 (only one of which is illustrated in FIG. 2) that connect cylinder 22 with exhaust passageway 43. One exhaust valve 34 is disposed within each exhaust port 38. A valve element 48 of each exhaust valve 34 is configured to close exhaust port 38 when exhaust valve 34 is in a closed position and block fluid flow relative to cylinder 22. When exhaust valve 34 is lifted from the closed position, exhaust valve 32 allows a flow of fluid relative to cylinder 22.

As shown in FIG. 2, engine 20 includes a series of valve actuation assemblies 44. One valve actuation assembly 44 may be operatively associated with each pair of intake valves 32 for each cylinder 22. Each valve actuation assembly 44 is operable to move or "lift" the associated intake valve 32 or exhaust valve 34 from a first, or closed, position to a second, or open, position.

In the exemplary embodiment of FIG. 3, valve actuation assembly 44 includes a bridge 54 that is connected to each valve element 40 through a pair of valve stems 46. A spring 56 may be disposed around each valve stem 46 between cylinder head 30 and bridge 54. Spring 56 acts to bias both valve elements 40 into engagement with the respective valve seat 50 to thereby close each intake port 36.

Valve actuation assembly 44 may also include a rocker arm 64. Rocker arm 64 is configured to pivot about a pivot 66. One end 68 of rocker arm 64 is connected to bridge 54. The opposite end of rocker arm 64 is connected to a cam assembly 52. In the exemplary embodiment of FIG. 3, cam assembly 52 includes a cam 60 having a cam lobe and mounted on a cam shaft, a push rod 61, and a cam follower 62. One skilled in the art will recognize that cam assembly 52 may have other configurations, such as, for example, where cam 60 acts directly on rocker arm 64.

Valve actuation assembly 44 may be driven by cam 60. Cam 60 is connected to crankshaft 27 so that a rotation of crankshaft 27 induces a corresponding rotation of cam 60. Cam 60 may be connected to crankshaft 27 through any means readily apparent to one skilled in the art, such as, for example, through a gear reduction assembly (not shown). As one skilled in the art will recognize, a rotation of cam 60 will cause cam follower 62 and associated push rod 61 to periodically reciprocate between an upper and a lower position.

The reciprocating movement of push rod 61 causes rocker arm 64 to pivot about pivot 66. When push rod 61 moves in the direction indicated by arrow 58, rocker arm 64 will pivot and move bridge 54 in the opposite direction. The movement of bridge 54 causes each intake valve 32 to lift and open intake ports 36. As cam 60 continues to rotate, springs 56 will act on bridge 54 to return each intake valve 32 to the closed position.

In this manner, the shape and orientation of cam 60 controls the timing of the actuation of intake valves 32. As one skilled in the art will recognize, cam 60 may be configured to coordinate the actuation of intake valves 32 with the movement of piston 24. For example, intake valves 32 may be actuated to open intake ports 36 when piston 24 is withdrawing within cylinder 22 to allow air to flow from intake passageway 41 into cylinder 22.

A similar valve actuation assembly 44 may be connected to each pair of exhaust valves 34 for each cylinder 22. Either cam 60 or a second cam (not shown) may be connected to crankshaft 27 to control the actuation timing of exhaust valves 34. Exhaust valves 34 may be actuated to open exhaust ports 38 when piston 24 is advancing within cylinder 22 to allow exhaust to flow from cylinder 22 into exhaust passageway 43.

As shown in FIG. 3, valve actuation assembly 44 also includes a valve actuator 70. In the illustrated exemplary embodiment, valve actuator 70 is hydraulically actuated. It should be understood that valve actuator 70 may be actuated through other types of systems, such as for example, electronic solenoids or other hydraulic systems.

In the illustrated exemplary embodiment, valve actuator 70 includes an actuator cylinder 72 that defines an actuator chamber 76. An actuator piston 74 is slidably disposed within actuator cylinder 72 and is connected to an actuator rod 78. A return spring (not shown) may act on actuator piston 74 to return actuator piston 74 to a home position. Actuator rod 78 is engageable with an end 68 of rocker arm 64.

A fluid line 80 is connected to actuator chamber 76. Pressurized fluid may be directed through fluid line 80 into actuator chamber 76 to move actuator piston 74 within actuator cylinder 72. Movement of actuator piston 74 causes actuator rod 78 to engage end 68 of rocker arm 64.

Fluid may be introduced to actuator chamber 76 when intake valves 32 are in the open position to move actuator rod 78 into engagement with rocker arm 64 to thereby hold intake valves 32 in the open position. Alternatively, fluid may be introduced to actuator chamber 76 when intake valves 32 are in the closed position to move actuator rod 78 into engagement with rocker arm 64 and pivot rocker arm 64 about pivot 66 to thereby open intake valves 32.

Figure 4:
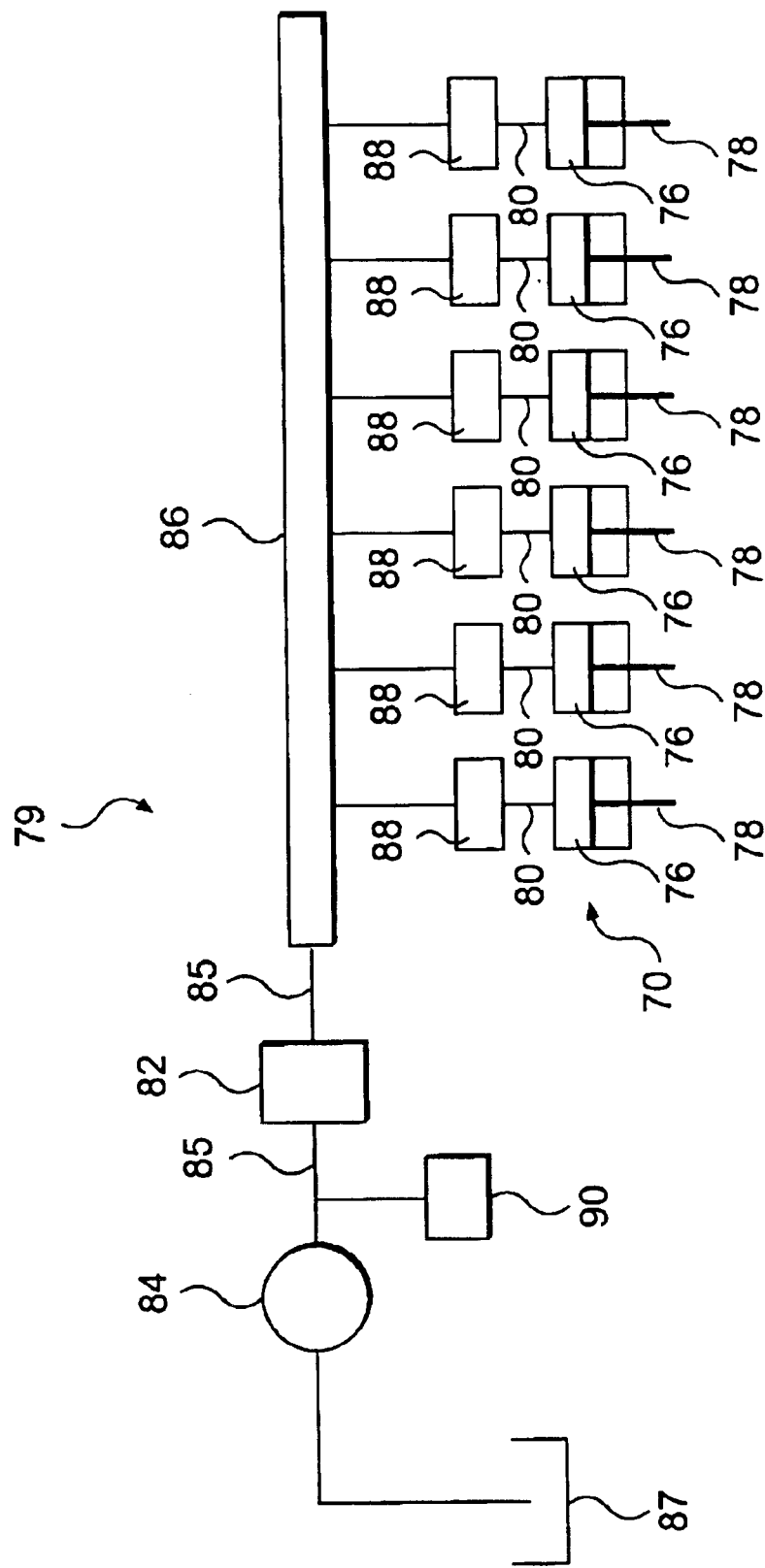
FIG. 4 is a schematic and diagrammatic representation of a fluid supply system for a hydraulic actuator for an engine valve in accordance with an exemplary embodiment of the present invention.

As illustrated in FIGS. 2 and 4, a source of hydraulic fluid 84 is provided to draw fluid from a tank 87 and to supply pressurized fluid to valve actuator 70. Source of hydraulic fluid 84 may be part of a lubrication system, such as typically accompanies an internal combustion engine. Such a lubrication system may provide pressurized fluid having a pressure of, for example, less than 700 KPa (100 psi) or, more particularly, between about 210 KPa and 620 KPa (30 psi and 90 psi). Alternatively, the source of hydraulic fluid may be a pump configured to provide fluid at a higher pressure, such as, for example, between about 10 MPa and 35 MPa (1450 psi and 5000 psi).

A fluid supply system 79 connects source of hydraulic fluid 84 with valve actuator 70. In the exemplary embodiment of FIG. 4, source of hydraulic fluid 84 is connected to a fluid rail 86 through fluid line 85. A control valve 82 is disposed in fluid line 85. Control valve 82 may be opened to allow pressurized fluid to flow from source of hydraulic fluid 84 to fluid rail 86. Control valve 82 may be closed to prevent pressurized fluid from flowing from source of hydraulic fluid 84 to fluid rail 86.

As illustrated in FIG. 4, fluid rail 86 supplies pressurized fluid from source of hydraulic fluid 84 to a series of valve actuators 70. Each valve actuator 70 may be associated with either the intake valves 32 or the exhaust valves 34 of a particular engine cylinder 22 (referring to FIG. 1). Fluid lines 80 direct pressurized fluid from fluid rail 86 into the actuator chamber 76 of each valve actuator 70.

A directional control valve 88 may be disposed in each fluid line 80. Each directional control valve 88 may be opened to allow pressurized fluid to flow between fluid rail 86 and actuator chamber 76. Each directional control valve 88 may be closed to prevent pressurized fluid from flowing between fluid rail 86 and actuator chamber 76. Directional control valve 88 may be normally biased into a closed position and actuated to allow fluid to flow through directional control valve 88. Alternatively, directional control valve 88 may be normally biased into an open position and actuated to prevent fluid from flowing through directional control valve 88. One skilled in the art will recognize that directional control valve 88 may be any type of controllable valve, such as, for example a two coil latching valve.

One skilled in the art will recognize that fluid supply system 79 may have a variety of different configurations and include a variety of different components. For example, fluid supply system 79 may include a check valve placed in parallel with directional control valve 88 between control valve 82 and hydraulic actuator 70. In addition, fluid supply system 79 may include a source of high pressure fluid. Fluid supply system 79 may also include a snubbing valve to control the rate of fluid flow from hydraulic actuator 70 and a damping system, which may include an accumulator and a restricted orifice, to prevent pressure oscillations in actuator chamber 76 and fluid line 80.

As shown in FIG. 2, a controller 100 is connected to each valve actuation assembly 44 and to control valve 82. Controller 100 may include an electronic control module that has a microprocessor and a memory 101. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

Controller 100 may be programmed to control one or more aspects of the operation of engine 20. For example, controller 100 may be programmed to control valve actuation assembly 44, the fuel injection system, and any other engine function commonly controlled by an electronic control module. Controller 100 may control engine 20 based on the current operating conditions of the engine and/or instructions received from an operator.

Figure 5:
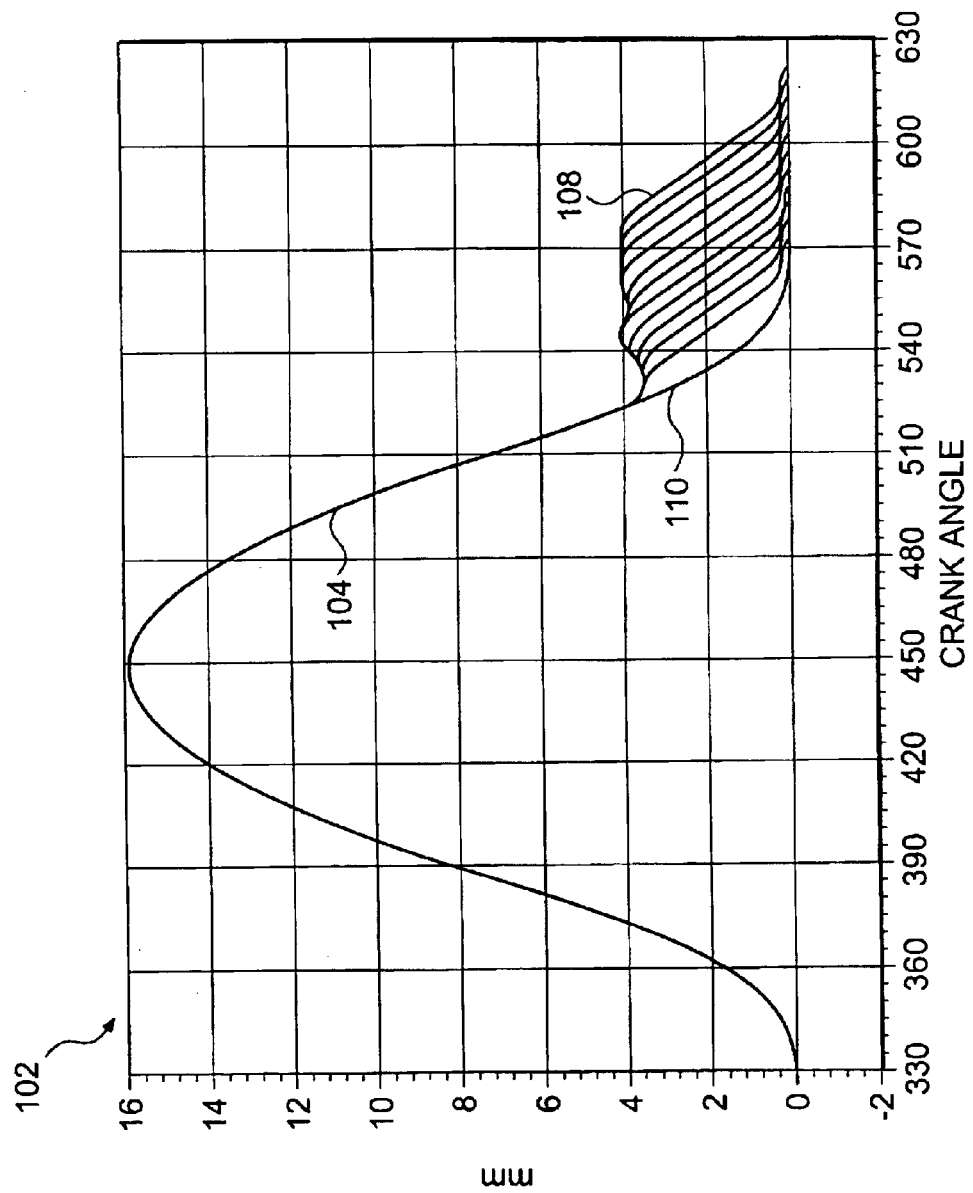
FIG. 5 is a graphic illustration of an exemplary intake valve actuation in accordance with the present invention.

Controller 100 may control valve actuation assembly 44 by transmitting a signal, such as, for example, a current, to directional control valve 88. The transmitted signal may result in the selective opening and/or closing of directional control valve 88. If directional control valve 88 is a normally closed valve, the transmitted signal may cause directional control valve 88 to open for a certain period of time. If directional control valve 88 is a normally open valve, the transmitted signal may cause directional control valve to close for a certain period of time. By controlling the opening and closing of directional control valve 88, controller may control the flow of fluid to and from valve actuator 70 and thereby control the engagement of actuator rod 78 with rocker arm 64 to delay the closing of intake valve 32 for a predetermined period. An exemplary intake valve actuation 104 is illustrated in FIG. 5.

As illustrated in FIGS. 1–4, engine system 10 may include a series of sensors, which are described in greater detail below. Each sensor is configured to monitor a particular operating parameter of engine 20. One skilled in the art may recognize that alternative sensors may be used with engine system 10 to monitor other operating parameters of engine 20.

As shown in FIG. 1, an intake sensor 16 may be disposed in intake passageway 13. Intake sensor 16 may be configured to sense the pressure of the intake air and/or the mass flow rate of the intake air. Intake sensor 16 may be any type of sensor readily apparent to one skilled in the art as capable of sensing these types of parameters and may be disposed at any point along intake passageway 13.

As also shown in FIG. 1, at least one engine sensor 18 is operatively connected with engine 20. Engine sensor 18 may be any type of sensor commonly used to monitor an operating parameter of engine 20. For example, engine sensor 18 may be configured to sense the load on engine 20, the amount of fuel being supplied to engine 20, the rotational speed of engine 20, the pressure within one or more cylinders 22, the rotational angle of crankshaft 27, or any other commonly sensed operating parameter. Engine sensor 18 may be any type of sensor readily apparent to one skilled in the art as capable of sensing these types of engine operating parameters.

Memory 101 of controller 100 may store information related to the operation of engine 20 in the form of a "map." For the purposes of the present disclosure, the term "map" is intended to include any electronic storage structure for storing information related to the operation of the engine, such as, for example, data tables, look-up tables, graphs, or any other electronic storage format readily apparent to one skilled in the art. These maps may define optimal engine operating characteristics as a function of engine operating parameters. For example, memory 101 may store a map that defines an optimal valve actuation period for a particular engine speed and load. Similarly, memory 101 may store a map that defines an optimal fuel delivery rate for a particular engine speed and load. Memory 101 may also store a map that defines an optimal air fuel ratio for a particular engine speed and load. Memory 101 may further store a map that defines limits on the valve actuation period for a particular engine speed and engine load.

Memory 101 may store different versions or variations on each of these maps. For example, memory 101 may store one valve actuation period map that provides optimal operating characteristics for steady state engine operation. Memory 101 may store a second valve actuation period map that provide optimal operating characteristics for transient conditions, where the engine load and/or the engine speed are changing. One skilled in the art may recognize that memory 101 may store additional maps or other variations that define other engine operating characteristics based on these, or other, operating parameters.

Figure 6:
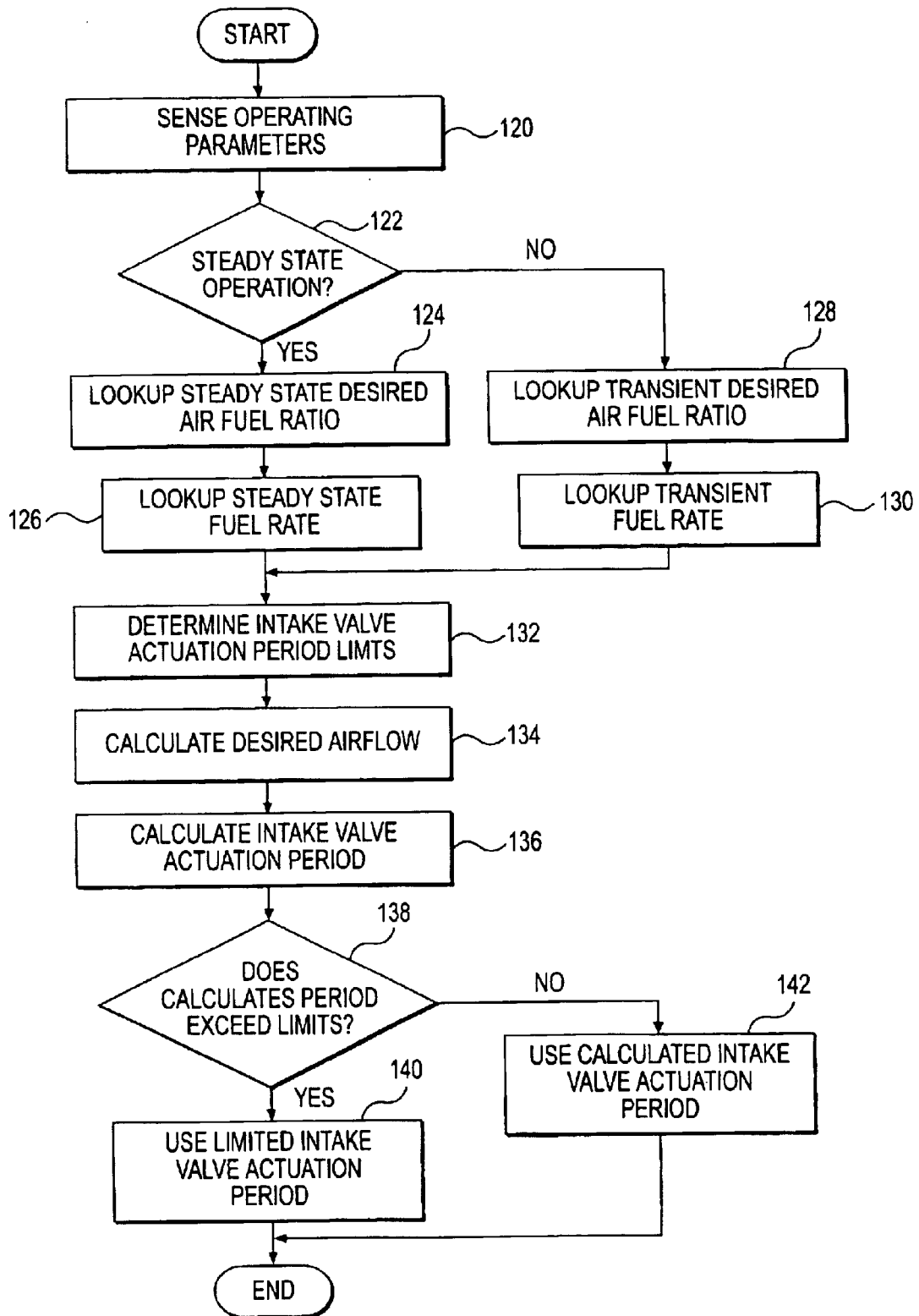
FIG. 6 is a flowchart illustrating an exemplary method for controlling a variable valve actuation system in accordance with the present invention.

Controller 100 may use the information provided by the sensors to access the maps stored in memory 101 to identify an optimal intake valve actuation period for the current engine operating conditions. The flowchart of FIG. 6 illustrates an exemplary method of determining an optimal intake valve actuation period.

INDUSTRIAL APPLICABILITY

Controller 100 may selectively operate valve actuator 70 to implement a late intake type Miller cycle in engine 20. When operating under the late intake Miller cycle, controller 100 operates valve actuator 70 to delay the closing of intake valve 32 from a conventional closing, where the closing substantially coincides with the end of an intake stroke, to a delayed closing, where intake valve 32 is held open for a predetermined portion of a compression stroke. The duration of the intake valve actuation period may be determined based on the current operating conditions of engine 20.

As described above, cam assembly 52 controls the initial actuation timing of intake valves 32. As cam 60 and push rod 61 start to pivot rocker arm 64, controller 100 ensures control valve 82 and directional control valve 88 are in an open position. This allows pressurized fluid to flow from source of hydraulic fluid 84 through fluid rail 86 and into actuator chamber 76. The force of the fluid entering actuator chamber 76 moves actuator piston 74 so that actuator rod 78 follows end 68 of rocker arm 64 as rocker arm 64 pivots to open intake valves 32. The distance and rate of movement of actuator rod 78 will depend upon the configuration of actuator chamber 76 and fluid supply system 79. Fluid supply system 79 may be configured to provide a sufficient flow of fluid to actuator chamber 76 to ensure that actuator chamber 76 is filled with fluid before cam 60 returns intake valve 32 to the closed position.

Controller 100 may actuate valve actuator 70 by closing directional control valve 88. This prevents fluid from escaping from actuator chamber 76. As cam 60 continues to rotate and springs 56 urge intake valves 32 towards the closed position, actuator rod 78 will engage end 68 of rocker arm and prevent intake valves 32 from closing. As long as directional control valve 88 remains in the closed position, the trapped fluid in actuator chamber 76 will prevent springs 56 from returning intake valves 32 to the closed position. Thus, valve actuator 70 will hold intake valves 32 in the open position, independently of the action of cam assembly 52.

Controller 100 may disengage valve actuator 70 to allow intake valves 32 to close by opening directional control valve 88. This allows the pressurized fluid to flow out of actuator chamber 76. The force of springs 56 forces the fluid from actuator chamber 76, thereby allowing actuator piston 74 to move within actuator cylinder 72. This allows rocker arm 64 to pivot so that intake valves 32 are moved to the closed position.

As illustrated in FIG. 5, operation of valve actuator 70 may extend intake valve actuation 104 from a conventional closing 110 to a delayed closing 108. The period, or duration, of the extended intake valve actuation may be measured in terms of the angle of rotation of crankshaft 27, as a function of time, or in any other manner readily apparent to one skilled in the art. When implementing a late intake type Miller cycle, the extended intake valve actuation period may be between about 0° and 120° crankshaft rotation. One skilled in the art will recognize, however, that valve actuator 70 may be used to implement other types of valve actuation timing variations, such as, for example, engine braking.

Controller 100 may vary the intake valve actuation period based upon the operating conditions that engine 20 is experiencing. For example, when engine 20 is operating in a steady state condition and is experiencing a light load, the optimal duration of the valve actuation period may be shorter than when engine 20 is operating under a steady state condition and is experiencing an increased load, such as a heavy load acceleration. When engine 20 is operating in a steady state condition, the optimal duration of the valve actuation period may increase as the load on the engine increases.

In one exemplary method, controller 100 may determine the valve actuation period by sensing the current engine speed and load and accessing a map stored in memory 101. The map may set forth the desired valve actuation period for a series of different engine speeds and loads. Based on the information provided in this map, controller 100 may control valve actuator 70 to achieve the desired valve actuation period.

An alternative method of determining the intake valve actuation period is illustrated in the flowchart of FIG. 6. One or more operating parameters of engine 20 are sensed. (Step 120). For example, controller 100 may receive an indication of the engine speed and the load from engine sensor(s) 18 and an indication of the intake air pressure from intake sensor 16.

Based on the operating parameter(s) of engine 20, controller 100 determines if engine 20 is operating in a steady state condition or a transient condition. (Step 122). Controller 100 may make this determination based on a comparison between the current values of the sensed operating parameters and previous values of the operating parameters. For example, an increase in the engine speed or engine load may indicate that engine 20 is experiencing a transient condition. One skilled in the art will recognize that various parameters and analysis may be used to make this determination.

Controller 100 may determine the desired air fuel ratio and the desired fuel rate for the current operating conditions. If engine 20 is operating in a steady state mode, controller 100 may access maps that define the optimal air fuel ratio and fuel rate for the current steady state conditions. (Steps 124 and 126). Alternatively, if engine 20 is operating in a transient condition, controller 100 may access maps that define the optimal air fuel ratio and fuel rate for the current transient operating conditions.

Controller 100 may then determine if there are any limits on the valve actuation period. (Step 132). The valve actuation period may be limited to control the amount of emissions generated by engine 20 and/or to prevent damage to engine 20. A significant decrease in the valve actuation period may result in an increase in the compression ratio and maximum pressure within each cylinder 22. The increase in pressure in each cylinder 22 may damage engine 20.

Any such limitations on the valve actuation period may be stored in a map in memory 101. The map may be based on engine parameters, such as engine speed and engine load, or any other conditions apparent on one skilled in the art. Controller 100 may access this map to determine the limits on the valve actuation period for the current operating conditions of engine 20.

Controller 100 also calculates the desired airflow for the operating conditions. (Step 134). The desired airflow may be calculated by multiplying the fuel rate (as determined in step 126 or step 130) by the air fuel ratio (as determined in step 124 or step 128).

Controller 100 may then calculate the intake valve actuation period. (Step 136). The intake valve actuation period may be expressed as a function of the engine speed (ES), the intake air pressure (IP), and the desired airflow (AF). For example, the intake valve actuation period (P) may be determined by the following equation:

$$P=A+B(ES)+C(ES)^2+D(IP)+E(IP)^2+F(AF)+G(AF)$$

Where A, B, C, D, E, F, G, and H are constants. For example, the values of these constants may be as follows: A=342.03; B=−0.213; C=6.27E-5; D=−1.215; E=0.00141; F=12.14; G=−0.0558; and H=−5.27E-1.

The above formula will yield an intake valve actuation period, P, that is expressed in terms of an engine crank angle. The determined crank angle may represent the angle at which the current to directional control valve 88 should be terminated to open directional control valve 88 and release valve actuator 70. Alternatively, the determined crank angle may represent the angle at which intake valve actuator 70 should be returned to the closed position. In the latter example, controller 100 may then determine the engine crank angle at which to terminate the current to directional control valve 88 based on a constant that is indicative of the time required for the intake valve 32 to close after the current to directional control valve 88 has been terminated. One skilled in the art may recognize that different formulas and/or constants may be developed to present different representations of the valve actuation period. For example, valve actuation period may be expressed as an amount of a rotation of crankshaft or a time period.

Controller 100 may then compare the calculated valve actuation period with any limits on the valve actuation period. (Step 138). If the calculated valve actuation period would exceed any limitations and subject engine 20 to possible damage, controller 100 will use the limited valve actuation period, as determined in Step 132. (Step 140). If the calculated valve actuation period would not exceed any limitation, controller 100 will use the calculated valve actuation period. (Step 142).

Controller 100 may then control directional control valve 88 to actuate valve actuator 70 to achieve the desired valve actuation period. Controller 100 may continuously monitor the operating parameters of engine 20 and adjust the valve actuation period accordingly. In this manner, controller 100 may optimize the air fuel ratio based on the current operating conditions of engine 20.

As will be apparent from the foregoing description, the present invention provides a method and system for controlling a variable valve actuation assembly for an internal combustion engine. This provides for the optimization of the air fuel ratio supplied to the engine based on the operating conditions of the engine. The air fuel ratio may be optimized to improve the performance of the engine and/or reduce the amount of emissions generated by the engine.

It will be apparent to those skilled in the art that various modifications and variations can be made in the system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method of controlling a variable valve actuation system for an engine, comprising:
    operating a cam assembly to move an intake valve between a first position where the intake valve blocks a flow of fluid and a second position where the intake valve allows a flow of fluid, the cam assembly being adapted to move the intake valve to the first position at a predetermined timing;
    sensing at least one operating parameter of the engine;
    determining a desired valve actuation period based on the at least one operating parameter;
    engaging a valve actuator operatively with the intake valve to prevent the intake valve from returning to the first position at the predetermined timing in response to operation of the cam assembly; and
    releasing the valve actuator to allow the intake valve to return to the first position after the predetermined timing and at the end of the determined valve actuation period.

2. The method of claim 1, further including accessing a map defining a relationship between the at least one operating parameter and a valve actuation period to determine the desired valve actuation period.

3. The method of claim 1, wherein the desired valve actuation period is adapted to achieve a desired air fuel ratio.

4. The method of claim 3, further including accessing a map defining a relationship between the at least one operating parameter and an air fuel ratio to determine the desired air fuel ratio.

5. The method of claim 4, wherein the desired valve actuation period is determined as a function of an engine speed, an intake air pressure, and the desired air fuel ratio.

6. The method of claim 1, wherein the at least one operating parameter is a speed of the engine.

7. The method of claim 1, further including sensing a second operating parameter of the engine and basing at least a part of the determination of the valve actuation period on the second operating parameter.

8. The method of claim 7, wherein the second operating parameter of the engine is a load on the engine.

9. The method of claim 1, further including modifying the desired valve actuation period to prevent an excessive pressure within a cylinder.

10. The method of claim 1, wherein the desired valve actuation period is determined in terms of a crankshaft rotational angle at which the valve actuator is to be released.

11. The method of claim 1, wherein the valve actuation period extends the closing of the intake valve by a predetermined number of degrees of a rotation of a crankshaft.

12. The method of claim 11, wherein the predetermined number of degrees is between about 0° and 120° of crankshaft rotation.

13. An intake valve actuation system for an engine, comprising:
an intake valve moveable between a first position where the intake valve prevents a flow of fluid and a second position where the intake valve allows a flow of fluid;
a cam assembly connected to the intake valve to move the intake valve between the first position and the second position, the cam assembly adapted to move the intake valve to the first position at a predetermined timing;
a valve actuator configured to selectively engage the intake valve and prevent the intake valve from returning to the first position at the predetermined timing;
a sensor operable to sense an operating parameter of the engine; and
a controller operable to determine a desired valve actuation period based on the sensed operating parameter of the engine and to actuate the valve actuator to prevent the intake valve from returning to the first position for the determined desired valve actuation period after the predetermined timing and to release the valve actuator to allow the intake valve to return to the first position after the predetermined timing and at the end of the determined desired valve actuation period.

14. The system of claim 13, wherein the controller includes a memory storing a first map defining a relationship between the at least one operating parameter and a valve actuation period for determining the desired valve actuation period.

15. The system of claim 14, wherein the first map defines a relationship between an engine speed, an engine load, and the valve actuation period.

16. The system of claim 14, wherein the memory further stores a second map defining a relationship between the at least one operating parameter and the desired air fuel ratio.

17. The system of claim 16, wherein the second map defines a relationship between an engine speed, an engine load, and the desired air fuel ratio.

18. The system of claim 13, wherein the sensor senses a speed of the engine.

19. The system of claim 18, further including a second sensor operable to sense a second operating parameter of the engine and the controller determines the desired valve actuation period based at least in part on the second operating parameter.

20. The system of claim 19, wherein the second operating parameter of the engine is a load on the engine.

21. An engine, comprising:
an engine block defining at least one cylinder;
a piston slidably disposed within the at least one cylinder;
an intake valve moveable between a first position where the intake valve prevents a flow of fluid to the at least one cylinder and a second position where the intake valve allows a flow of fluid to the at least one cylinder;
a cam assembly connected to the intake valve to move the intake valve between the first position and the second position, the cam assembly adapted to move the intake valve to the first position at a predetermined timing;
a valve actuator configured to selectively engage the intake valve and prevent the intake valve from returning to the first position until after the predetermined timing;
a sensor operable to sense an operating parameter of the engine; and
a controller operable to determine a desired valve actuation period based on the sensed operating parameter of the engine and to actuate the valve actuator to prevent the intake valve from returning to the first position for the determined valve actuation period after the predetermined timing and to release the valve actuator to allow the intake valve to return to the first position after the predetermined timing and at the end of the determined desired valve actuation period.

22. The engine of claim 21, further including a crankshaft coupled to the cam assembly and the piston and wherein the determined desired valve actuation period is measured in terms of a rotational angle of the crankshaft.

23. The engine of claim 22, wherein the determined desired valve actuation period is between about 0° and 120° of crankshaft rotation.

24. The engine of claim 21, wherein the controller includes a memory storing a first map defining a relationship between the at least one operating parameter and a valve actuation period for determining the desired valve actuation period.

25. The engine of claim 24, wherein the first map defines a relationship between an engine speed, an engine load, and the valve actuation period.

26. The engine of claim 24, wherein the memory further stores a second map defining a relationship between the at least one operating parameter and the desired air fuel ratio.

27. The engine of claim 26, wherein the second map defines a relationship between an engine speed, an engine load, and the desired air fuel ratio.

28. The engine of claim 21, wherein the sensor senses a speed of the engine.

29. The engine of claim 28, further including a second sensor operable to sense a second operating parameter of the engine and the controller determines the desired valve actuation period based at least in part on the second operating parameter.

30. The engine of claim 29, wherein the second operating parameter of the engine is a load on the engine.

31. A method of controlling a variable valve actuation system for an engine, comprising:
operating a cam assembly to move an intake valve between a first position where the intake valve blocks a flow of fluid and a second position where the intake valve allows a flow of fluid, the cam assembly being adapted to move the intake valve to the first position at a predetermined timing;

sensing at least one operating parameter of the engine;

determining a desired valve actuation period based on the at least one operating parameter;

identifying a limitation on the desired valve actuation period based on the at least one operating parameter;

modifying the desired valve actuation period based on the identified limitation;

engaging a valve actuator operatively with the intake valve to prevent the intake valve from returning to the first position at the predetermined timing in response to operation of the cam assembly; and releasing the valve actuator to allow the intake valve to return to the first position at the end of the modified desired valve actuation period and after the predetermined timing.

32. The method of claim 31, further including accessing a map defining a relationship between the at least one operating parameter and a minimum valve actuation period to determine the limitation.

33. The method of claim 31, wherein the modified desired valve actuation period is adapted to prevent an excessive pressure within a cylinder of the engine.

34. The method of claim 31, wherein the limitation is determined as a function of an engine speed, an intake air pressure, and the desired air fuel ratio.

35. The method of claim 31, wherein the desired valve actuation period is determined in terms of a crankshaft rotational angle at which the valve actuator is to be released.

36. The method of claim 35, wherein the valve actuation period extends the closing of the intake valve by a predetermined number of degrees of a rotation of a crankshaft.

* * * * *